(12) United States Patent
Froelich et al.

(10) Patent No.: US 6,526,838 B1
(45) Date of Patent: Mar. 4, 2003

(54) ULTRASONIC FLUID METER WITH IMPROVED RESISTANCE TO PARASITIC ULTRASOUND WAVES

(75) Inventors: Benoît Froelich, Tokyo (JP); Eric Lavrut, Orleans (FR); Philippe Hocquet, Oslo (NO)

(73) Assignee: Schlumberger Industries, S.A. (FR)

( * ) Notice: Subject to any disclaimer, the term of this patent is extended or adjusted under 35 U.S.C. 154(b) by 0 days.

(21) Appl. No.: 09/300,175

(22) Filed: Apr. 27, 1999

(51) Int. Cl.[7] .................................................. G01F 1/66
(52) U.S. Cl. ..................................................... 73/861.28
(58) Field of Search .................... 73/861.04, 861.28, 73/861.27, 194; 181/46, 50

(56) References Cited

U.S. PATENT DOCUMENTS 3,583,523 A * 6/1971 Williams ..................... 181/33
3,642,094 A * 2/1972 Yancey ........................ 181/50
3,906,791 A * 9/1975 Lynnworth ................... 73/194
5,369,998 A * 12/1994 Sowerby .................. 73/861.04

* cited by examiner

Primary Examiner—Benjamin R. Fuller
Assistant Examiner—Jewel V. Thompson
(74) Attorney, Agent, or Firm—Straub & Pokotylo; Michael P. Straub

(57) ABSTRACT

The invention provides a fluid meter comprising ultrasound transducers, attenuation means for attenuating parasitic ultrasound waves of wavelength $\lambda$, and constituted by at least one passage in which said waves propagate along a main direction corresponding to a longitudinal dimension a of said passage, said passage having a transverse dimension b perpendicular to a and much smaller than the wavelength $\lambda$ of the parasitic waves in the propagation medium, said passage comprising a plurality of consecutive passage portions each having a part presenting a reduction in transverse propagation section along the dimension b of the passage, the longitudinal dimension of each passage portion being substantially equal to $\lambda/2$.

26 Claims, 11 Drawing Sheets

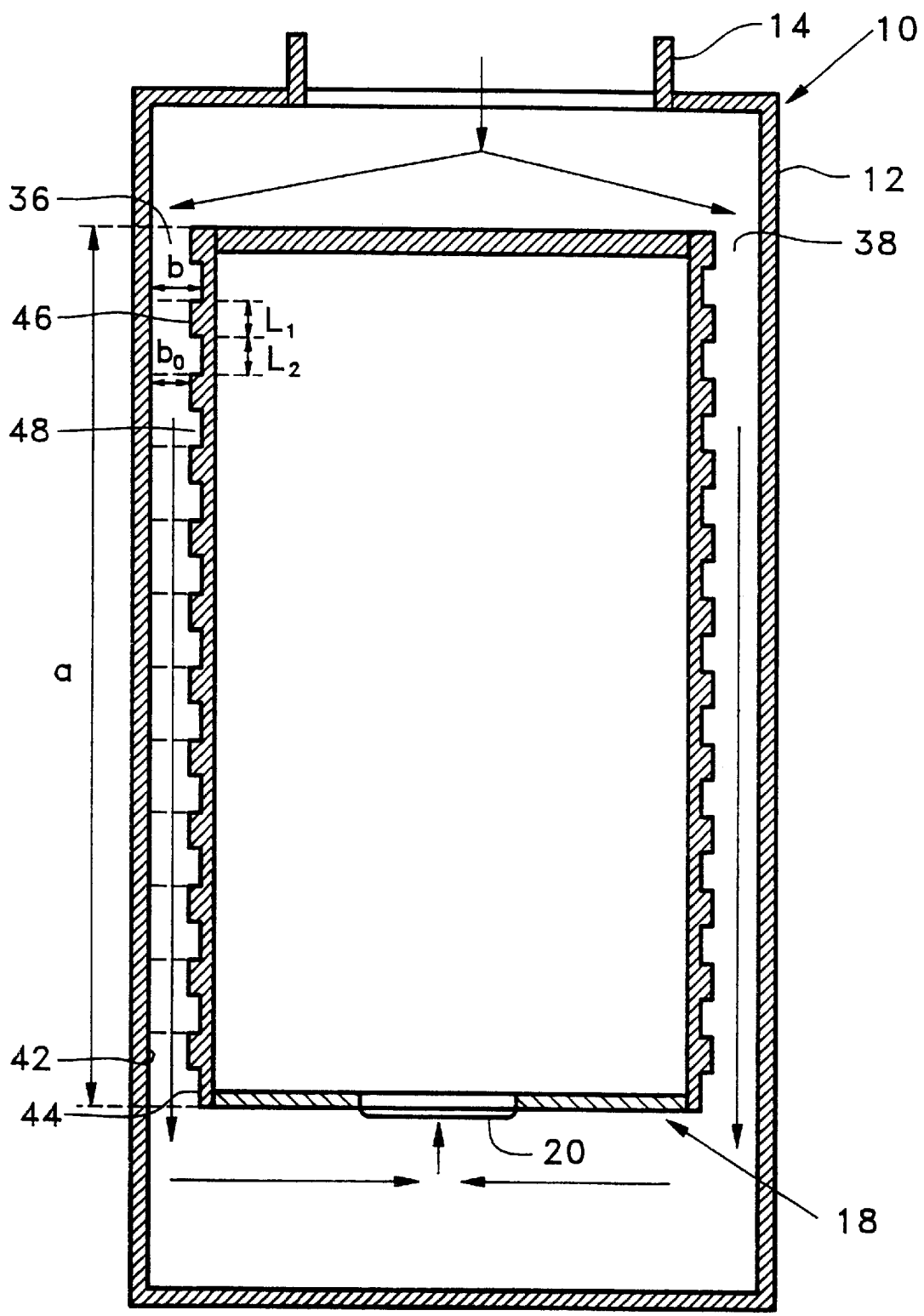
Fig. 3(A-A)

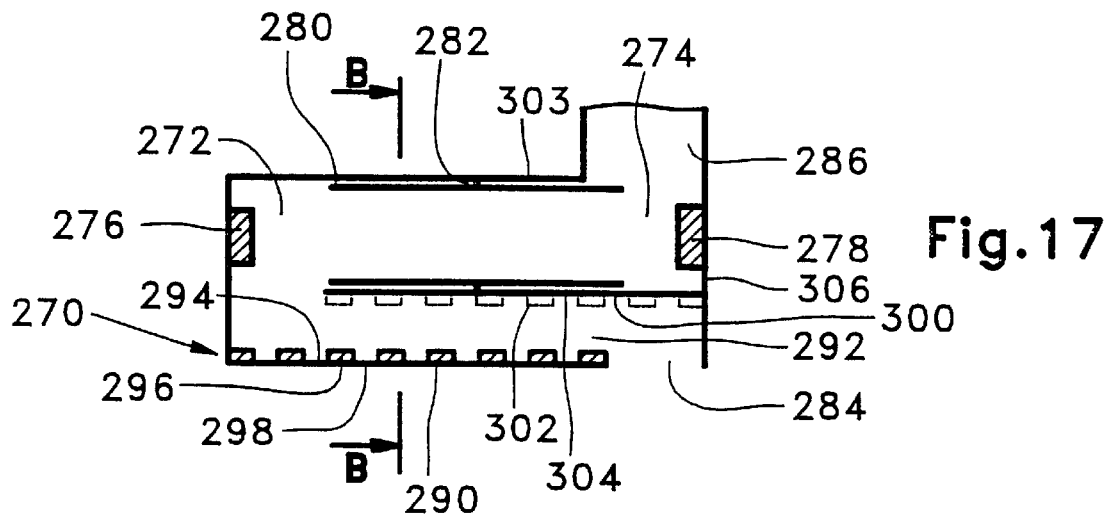
Fig.17
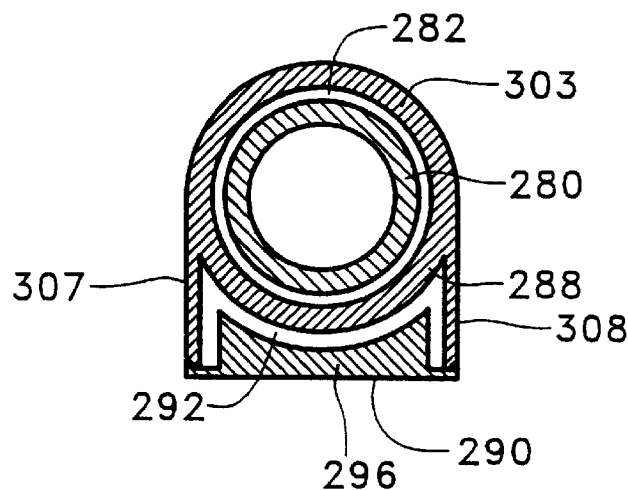
Fig.18(B-B)
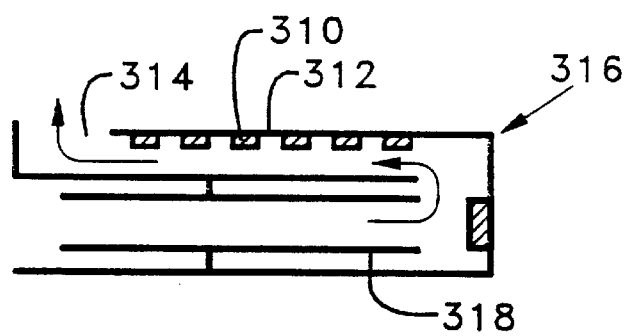
Fig.19
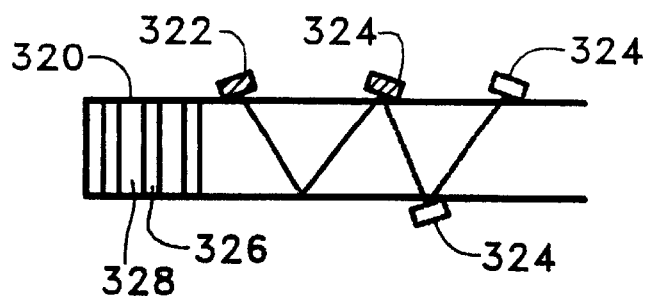
Fig.20

ULTRASONIC FLUID METER WITH IMPROVED RESISTANCE TO PARASITIC ULTRASOUND WAVES

FIELD OF THE INVENTION

The invention relates to an ultrasonic fluid meter including ultrasound transducers defining between them an ultrasonic measurement path and emitting and receiving ultrasound waves into the fluid along said measurement path at at least one ultrasound frequency.

BACKGROUND OF THE INVENTION

It has been known for many years that the speed of a flowing fluid can be measured by emitting ultrasound waves into the fluid from ultrasound transducers both in the flow direction of said fluid and in the opposite direction, and by measuring the respective propagation times of the waves emitted in both directions.

Starting from a measurement of the speed of the fluid, it is easy to determine its flow rate and also the volume of fluid that has flowed over a given length of time.

Nevertheless, in such fluid meters, the Applicant has observed that "parasitic" ultrasound waves propagate and disturb reception at one of the transducers of the ultrasound waves emitted by the other transducer along the measurement path.

Two different types of parasitic ultrasound wave can be mentioned: ultrasound waves generated by a source outside the fluid meter; and ultrasound waves emitted by the transducers themselves.

The first type is encountered, for example, when a pressure regulator is installed upstream from a gas meter.

Pressure regulators are used, for example, to reduce pressure of a gas from several bars down to about 20 mbars upstream from ultrasonic gas meters. Unfortunately, the pressure drop in the regulator is a source of a considerable amount of noise and it has been observed that such a pressure drop can give rise to parasitic ultrasound waves of great pressure amplitude and of frequency(ies) corresponding to the frequency(ies) of the ultrasound transducers of the meter.

These parasitic ultrasound waves are conveyed by the fluid flow to the ultrasound transducers. This gives rise to considerable errors in measurement that are completely unacceptable.

The first type of parastic ultrasound can also be encountered in ultrasonic liquid meters which are placed downstream from a sharp reduction of flow section that can give rise to a phenomenon known as "cavitation" with bubbles appearing in the liquid at a frequency close to that used by the ultrasound transducers.

The second type of parasitic ultrasound wave corresponds to the case where the ultrasonic measurement path defined between the ultrasound transducers lies within a duct (tube, . . . ) conveying the fluid whose flow rate is to be determined and where the duct is made of a material that is not sufficiently stiff to prevent acoustic coupling between the fluid medium and said material.

This can be the case, for example, when the duct is made of metal (steel, . . . ) and the fluid medium is water, or indeed when the duct is made of plastic and the fluid is a gas.

Under such circumstances, when ultrasound waves are emitted from one transducer towards the other inside the measurement duct, a portion of these waves, referred to as "parasitic" ultrasound waves, propagate through the material constituting said measurement duct and reach the other transducer either before or together with the ultrasound waves propagating through the fluid medium.

It thus becomes very difficult to distinguish amongst the ultrasound waves received from the other transducer between those which have indeed propagated in the fluid medium and those which have propagated in the medium constituting the measurement duct.

Document EP-A- 0 457 999 describes an ultrasound flow rate meter comprising a duct, in which the fluid whose flow rate is to be determined flows, and two transducers situated outside the duct. The ultrasound waves generated or received by the transducers are respectively transmitted to the fluid or received from the fluid by means of disks associated with the transducers and wall portions situated facing the transducers. The device described includes dampers or groove/projection pairs whose object is to uncouple the wall portions from each other situated facing the transducers. Firstly, such a device uses a measuring principle aiming to cause the wall of the tube where the liquid flows to resonate, and secondly, it does not resolve the problem of the parasitic ultrasound waves of the first type.

Document FR-A-2 357 869 discloses means for attenuating soundwaves generated outside an ultrasound fluid meter and which are implemented in the form of a sleeve of acoustically insulating material placed in the fluid inlet fitting of the meter. Unfortunately, such attenuation means are insufficient and, in addition, they are incapable of attenuating parasitic ultrasound waves of the second type.

Document EP-A-0 048 791 discloses a device for eliminating ultrasound waves emitted by the transducers outside the measurement tube. Unfortunately, such a device does not enable ultrasound waves propagating in the wall of the measurement tube to be attenuated, nor does it attenuate parasitic ultrasound waves of the first type.

SUMMARY OF THE INVENTION

The present invention therefore seeks to remedy this problem by attenuating in simple and effective manner parasitic ultrasound waves propagating in an ultrasonic fluid meter and disturbing reception by one of the transducers of ultrasound waves emitted by the other transducer along the measurement path.

The present invention thus provides an ultrasonic fluid meter comprising ultrasound transducers defining between them an ultrasonic measurement path and emitting and receiving ultrasound waves into the fluid along said measurement path at at least one ultrasound frequency, and means for attenuating "parasitic" ultrasound waves of wavelength $\lambda$ which disturb reception by one of the transducers of ultrasound waves emitted by the other transducer, wherein the attenuation means are constituted by at least one passage in which said parasitic waves propagate in a main direction corresponding to a "longitudinal" dimension a of said passage, said passage having a transverse direction b perpendicular to the dimension a and much smaller than the wavelength $\lambda$ of the parasitic waves in the propagation medium, said passage comprising a plurality of consecutive passage portions each having a part that presents a reduction in transverse propagation section along the dimension b of the passage, with the longitudinal dimension of each passage portion being substantially equal to $\lambda/2$.

Thus, the parasitic ultrasound waves which propagate in the propagation medium mainly along the longitudinal dimension of the passage encounter on their path reductions in propagation section alternating with "normal" propagation sections, thus creating an acoustic impedance discontinuity in the medium, which reflects a portion of the energy contained in these waves, thereby attenuating the amplitude of these waves. Parasitic ultrasound waves that do not propagate along the longitudinal dimension of the passage but which nevertheless encounter small propagation sections on their path are also attenuated.

According to a characteristic of the invention, the passage is defined by at least two longitudinal surfaces facing each other and spaced apart along the dimension b, and on which at least one of them has a plurality of mutually parallel consecutive grooves formed in alternation with projections, each passage portion having a pair constituted by a groove and a projection.

By way of example, each groove has a V-shaped profile or a U-shaped profile thereby causing said surface to be crenellated.

In a variant embodiment, the parasitic waves are of wavelength that varies within a determined range, and the longitudinal dimension of the passage portions varies in increasing or decreasing manner to cover the determined range of wavelengths.

In a first aspect of the invention, the fluid meter comprises an enclosure provided with a fluid inlet orifice and a fluid outlet orifice, a measurement block fitted with ultrasound transducers and provided with at least two openings respectively enabling the fluid to reach the ultrasonic measurement path and to leave it, the passage(s) in which the parasitic ultrasound waves propagate being formed between the measurement path and at least one of the fluid inlet and outlet orifices.

In a first embodiment of the invention, the measurement block is disposed inside said enclosure in such a manner as to form between them the passage(s) in which the parasitic waves propagate, and along which the fluid flows prior to entering the measurement block or after leaving it.

For example, the surface on which the grooves are formed is the surface of the measurement block.

In a second embodiment, the measurement block includes the passage(s) enabling the parasitic ultrasound waves to be attenuated and formed between at least one of said openings and said measurement path, said passage(s) also serving to convey the fluid.

According to other characteristics of the invention:
the measurement path is formed within a measurement duct;
the measurement duct is at least partially disposed in a housing of the measurement block;
the passage(s) is (are) formed between the walls of the housing and the measurement duct;
the passage(s) is (are) formed around the measurement duct;
the passage(s) is (are) formed on one side only of the measurement duct;
the passages are formed on either side of the measurement duct;
the measurement block includes a "separator" wall on its side where the passage(s) is (are) formed to separate the measurement duct from the passage(s);
the measurement block includes another wall which is disposed facing the separator wall in such a manner that the facing surfaces of these two walls define the passage(s);
the other wall is a separate part fitted to the measurement block;
the groove/projection pairs are formed on the outside surface of the measurement duct;
the passage(s) is (are) formed along at least a portion of the measurement path; and
the passage(s) is (are) disposed inside the measurement duct.

In a second aspect of the invention, the fluid meter comprises a measurement duct constituting at least a portion of the ultrasound measurement path and presenting at least one peripheral wall corresponding to the passage in which the parasitic ultrasound waves propagate.

The surface on which the grooves are formed is the outside surface of the measurement duct, the reduction of the propagation section in each passage portion being located at each groove in said wall.

For example, the measurement duct is a tube.

The grooves are annular in shape and are disposed along the tube.

In a variant, a groove of helical shape is formed in the outside surface of the measurement tube.

Advantageously, the measurement tube can be screwed into a housing provided in the measurement block.

BRIEF DESCRIPTION OF THE DRAWINGS

Other characteristics and advantages appear on reading the following description given purely by way of non-limiting example and made with reference to the accompanying drawings, in which:

FIG. 3 is a section view along A—A of the meter shown in FIG. 1;

FIG. 16b shows a variant of the measurement block shown in FIG. 16a;

FIG. 17 is a longitudinal section view of a measurement block constituting a seventh variant embodiment;

FIG. 18 is an enlarged cross-section view of the measurement block shown in FIG. 17;

FIG. 19 is a fragmentary longitudinal section view of a measurement block constituting an eighth variant embodiment;

FIG. 20 is a fragmentary longitudinal section view of a measurement block constituting a ninth variant embodiment;

FIG. 21b is an enlarged view of the measurement duct shown in FIG. 21a;

FIG. 21c is a diagrammatic view of a variant of the measurement duct shown in FIG. 21a;

FIG. 22a is a view of a measurement duct constituting another variant of the measurement duct shown in FIG. 21a.

DETAILED DESCRIPTION OF THE PREFERRED EMBODIMENTS

Figure 1:
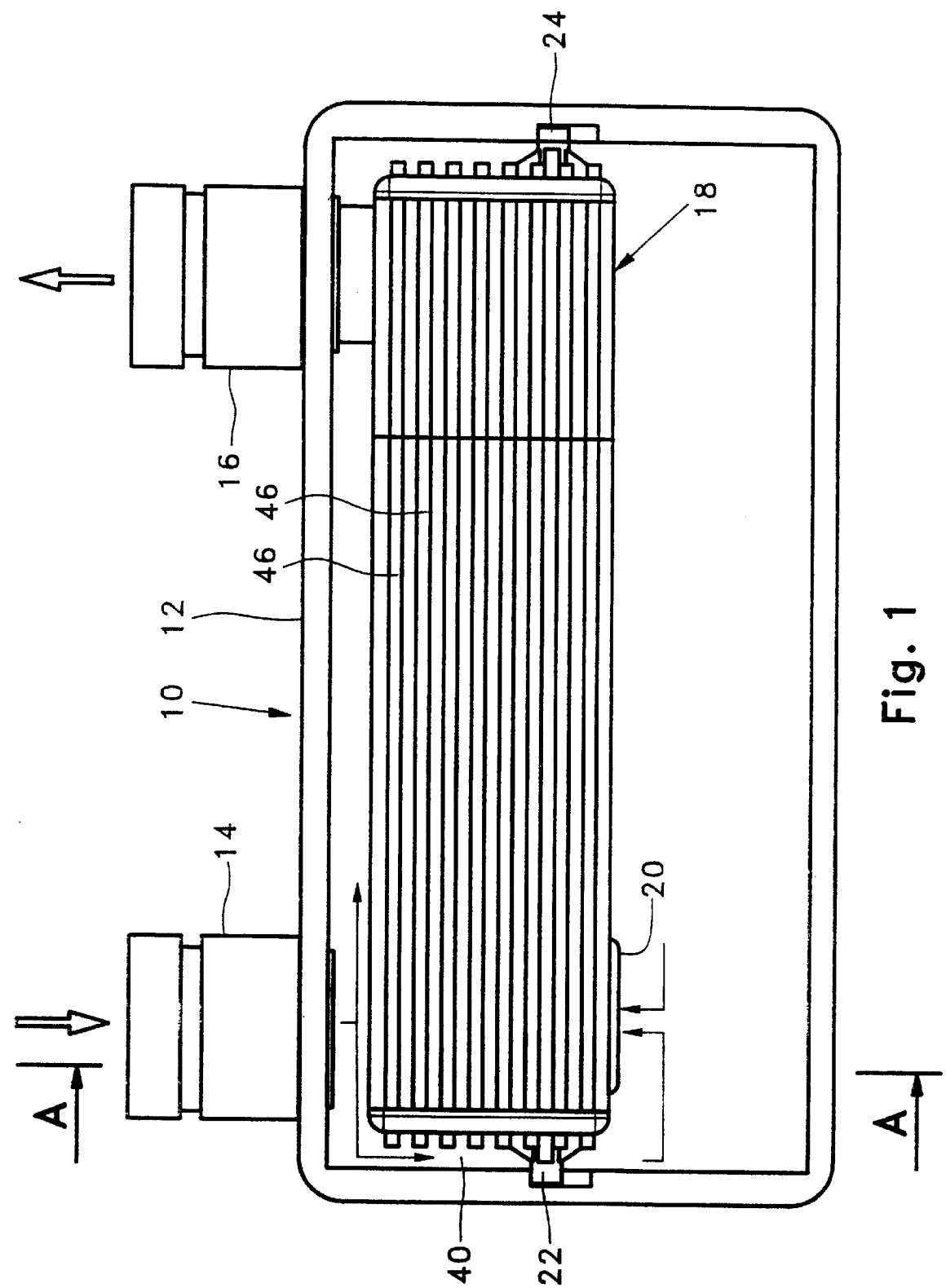
FIG. 1 is a view of a fluid meter of the invention with a portion of the cover removed to make the invention easier to understand.

FIG. 1 shows a gas meter located downstream from a pressure regulator (not shown in the figure) which generates in the pipe and in the gas meter parasitic ultrasound waves at a frequency equal, for example, to 40 kHz, thereby disturbing measurement of the gas flow rate.

As shown in the figure, the gas meter given overall reference 10 comprises a gas inlet 14 and a gas outlet 16, an enclosure 12 to which said inlet and outlet are connected, and a measurement block 18 disposed inside the enclosure 12. The measurement block 18 is organized inside the enclosure 12 in such a manner as to leave one or more passages between the block and the enclosure to be taken by the fluid in order to travel from the inlet 14 to an opening 20 formed in the bottom portion of the measurement block.

The measurement block 18 is held in position inside the enclosure 12 by two studs 22, 24 which are received in recesses formed in said enclosure 12.

Figure 2:
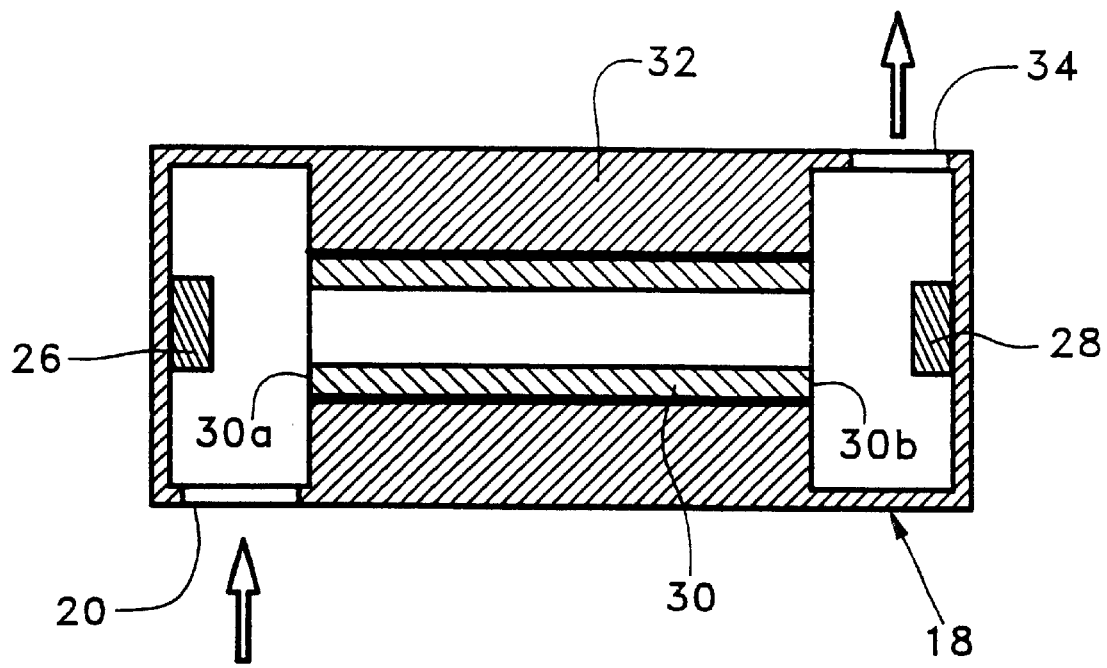
FIG. 2 is a view of the inside of the measurement block shown in FIG. 1.

As shown in FIG. 2, the measurement block 18 comprises the opening 20 through which the gas penetrates together with two ultrasound transducers 26, 28 each disposed facing one of the opposite ends of a measurement duct 30 that is tubular in shape and that constitutes the ultrasonic measurement path.

By way of example the ultrasound transducers operate at a frequency of 40 kHz. The measurement duct 30 passes through a wall 32 constituting a solid block between two housings within which the transducers 26, 28 are disposed. The gas penetrates into one of the housings of the measurement block 18 via the opening 20, as shown by the arrow in FIG. 2, penetrates into the measurement tube 30 via the end 30a of said tube, flows along the inside thereof, leaves the tube via its opposite end 30b, and then exits upwards via an outlet orifice 34. The outlet orifice 34 is connected to the gas outlet 16 shown in FIG. 1.

In the above-described ultrasonic gas meter, the ultrasound transducers 26, 28 alternately emit and receive ultrasound waves at a fixed ultrasound frequency, and the propagation time of the waves, and thus the flow rate of the fluid, are deduced from the ultrasound waves received by each of the transducers.

When a regulator is placed upstream from the gas meter, the above-mentioned parasitic ultrasound waves propagate into the meter and reach the ultrasound measurement path inside the measurement block 18 where they mix with the ultrasound waves emitted and received by the transducers, and thus greatly disturb ultrasonic measurement of the flow rate.

The above-mentioned passages are specially designed to exert an attenuation effect on the parasitic ultrasound waves present in the gas flow on their way to the ultrasonic measurement path. Each of the passages 36, 38 (FIG. 3) and 40 (FIG. 1) possesses a "longitudinal" dimension a.

The gas flow propagates along this longitudinal direction as do the parasitic ultrasound waves present in the flow. In order to ensure that the attenuation effect on the parasitic ultrasound waves propagating in this "main" direction is indeed effective, it is necessary for each of the above-mentioned passages to have a transverse dimension b perpendicular to the longitudinal direction a which is much less than the wavelength $\lambda$ of the parasitic waves in the fluid medium in which the parasitic waves are propagating.

This condition guarantees that only the plane mode of the ultrasound wave propagates along the passage, so it is the plane mode which is affected by the attenuation means of the invention. Otherwise, if the transverse dimension b of the passage and the wavelength $\lambda$ in the fluid medium are too similar or if b is greater than $\lambda$, then parasitic ultrasound wave propagation modes other than plane mode would appear, thereby reducing the effectiveness of the attenuation means.

The passage 36 is defined by at least two longitudinal surfaces 42, 44 disposed facing each other and spaced apart by the transverse dimension b of said passage, as shown in FIG. 3.

At least one of these longitudinal surfaces 42, 44 is organized in such a manner as to cause the passage to comprise a plurality of consecutive passage portions as marked by dashed lines in FIG. 3, each comprising a portion of reduced transverse propagation section in the dimension b of the passage. The surface in which this particular disposition is formed is the surface of the measurement block 18.

On the outside surface 44 of the measurement block, projections 46 are formed, e.g. by overmolding. These projections 46 are parallel to one another, perpendicular to the longitudinal dimension a of the passage, and between them they leave grooves 48 that are likewise parallel to one another.

It should be observed that instead of forming projections on the outside surface 44 of the measurement block 18, it would be equally possible to machine said surface so as to form a plurality of consecutive grooves that are mutually parallel and perpendicular to the longitudinal dimension a of the passage 36.

Each passage portion corresponds to a projection 46 and a groove 48 disposed side by side.

The projection 48 has a longitudinal dimension L1 in FIG. 3, and each groove 48 has a longitudinal dimension marked L2.

The transverse dimension of the passage at each groove 48 is equal to b, and the transverse dimension of the passage at each projection 46 is equal to bo.

For the attenuation means of the invention to attenuate the desired wavelength of the parasitic ultrasound waves, it is necessary for the longitudinal dimension of each passage portion, i.e. L1+L2, to be substantially equal to $\lambda/2$. It should be observed that the dimensions L1 and L2 may vary providing the above relationship is satisfied.

As shown in FIG. 3, each groove 48 is U-shaped in longitudinal profile, thus forming crenellations on the longitudinal surface 44.

The amplitude of the parasitic soundwaves propagating along the passage 36 is attenuated each time said waves encounter a smaller propagation section over each projection 46.

The smaller the transverse dimension of the passage over each projection 46 relative to the transverse dimension b over each groove 48, the greater the effectiveness of the attenuation, however it is also necessary to avoid exceeding certain values which could give rise to excessive headlosses in the gas flow.

As shown in FIG. 3, the pattern formed in this way on the longitudinal surface 44 is periodic.

By way of numerical example, L1=L2=2.5 mm, the dimension bo and b of the passage are respectively equal to 2 mm and to 3 mm, and the total length of the passage is equal to 60 mm, thus corresponding to 12 periods.

For various gases, and in particular for a mixture of air and methane, attenuation of more than 40 dB per decade has been obtained over a bandwidth of 12 kHz.

For methane, the wavelength $\lambda$ of parasitic waves is equal to 11 mm which is much greater than the dimensions b and bo.

The effectiveness of these attenuation means can be increased if projections and grooves are also formed on the surface 42, respectively facing the projections 46 and the grooves 48 on the surface 44 of the measurement block 18.

It should be observed that for given effectiveness in attenuation, the grooves and the projections could be provided solely in the inside surface 42 of the enclosure 12.

Figures 4A, 4B, 4C:
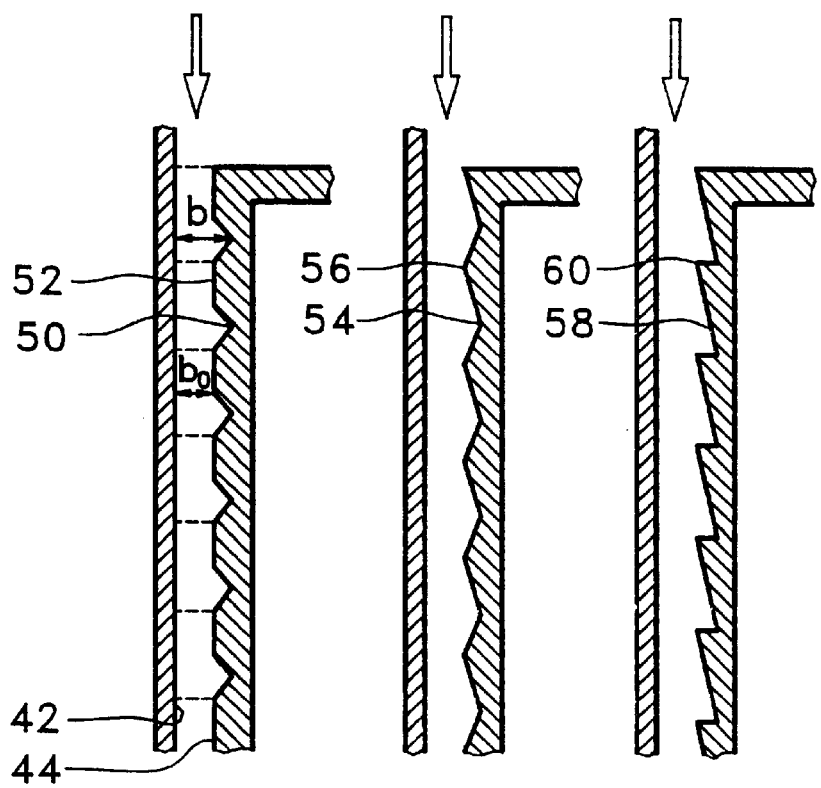
FIGS. 4a, 4b, and 4c are fragmentary diagrammatic views of various embodiments of the attenuation means shown in FIG. 3.

FIG. 4a shows a first variant embodiment of the attenuation means shown in FIG. 3, in which a plurality of consecutive grooves 50 that are mutually parallel are formed transversely in the longitudinal surface 44 of the measurement block, and preferably perpendicularly to the propagation direction of the flow in the passage.

Each groove 50 has a V-shaped profile, and two consecutive grooves 50 are separated by a passage portion 52 of essentially flat profile constituting the portion in which the propagation section offered to the fluid and to the parasitic ultrasound waves is reduced.

FIG. 4b shows another variant embodiment in which the grooves 54 occupy the major part of each of the consecutive passage portions, and the parts in each passage portion having a reduction of transverse propagation section, which parts are referenced 56, are reduced to mere edges.

FIG. 4c shows yet another variant embodiment of the attenuation means of the invention, in which the grooves 58 are formed by mutually parallel inclined slopes separated from one another by steep fronts, over which the reduced section part 60 of the passage portion is located. The longitudinal profile of the surface 44 is a sawtooth profile.

Whenever attenuation means are designed, they are adapted to a particular gas, and if it is desired to cover a wide range of wavelengths, e.g. for the purpose of enabling the meter to adapt to several types of gas, it is necessary to provide a special configuration of the above-mentioned passages 36, 38, and 40.

Figure 4D:
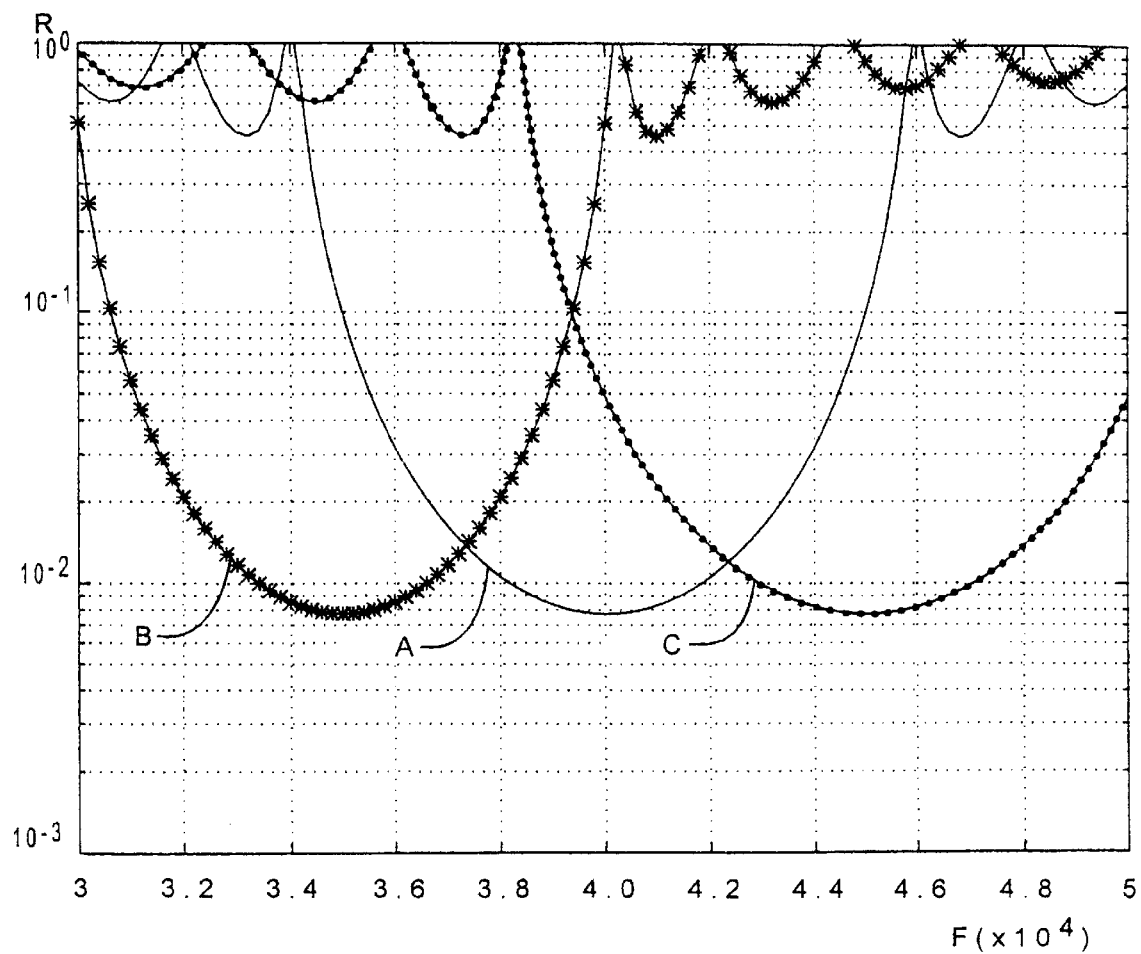
FIG. 4d is a graph having three curves A, B, and C representing the respective attenuation powers R of the attenuation means of the invention in three different gases as a function of the frequency of the parasitic waves.

In FIG. 4d, three curves A, B, and C give the ratio R of parasitic ultrasound wave amplitude between the inlet and the outlet of a passage such as that shown in FIGS. 1 and 3 (36, 38, or 40) as a function of the ultrasound frequency F.

Each curve is in the form of a main parabolic lobe accompanied by a plurality of small lobes.

Thus, by designing the passages of FIG. 3 to attenuate parasitic ultrasound waves at a frequency of 40 kHz in a mixture of air and methane, curve A is obtained by calculation to have maximum attenuation power at the frequency of 40 kHz.

However, if the mixture of air and methane is replaced by air on its own (curve B) or by methane on its own (curve C) it can be seen that the passage of FIG. 3 is not optimal in those gases at the frequency of 40 kHz.

Figure 5:
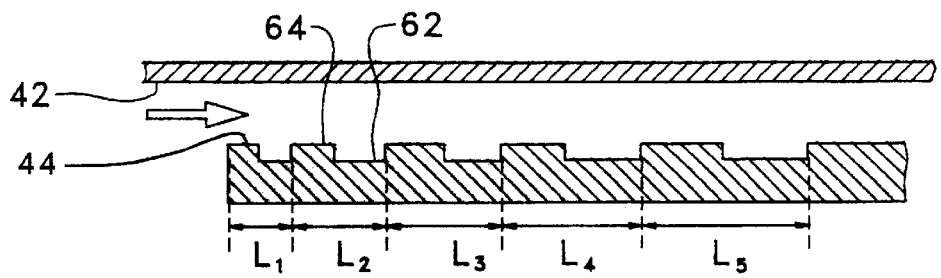
FIG. 5 is a fragmentary diagrammatic view of the attenuation means shown in FIG. 3 in an additional variant embodiment.

The variant embodiment shown in FIG. 5 shows one possibility for a special configuration of the passages 36, 38, and 40.

In this figure, the facing surfaces 42 and 44 define a passage for the flow of gas and for the propagation of parasitic ultrasound waves. In this passage, grooves 62 and projections 64 analogous to those shown in FIG. 3 are formed on the longitudinal section 44.

As can be seen in FIG. 5, the longitudinal dimension of the passage portions increases going from the inlet of the passage to the outlet of the passage so as to cover a determined range of wavelengths.

For example, it is possible to cover a range of wavelengths extending from 8.75 mm (air) to 11 mm (methane).

In practice, the passage portion(s) situated close to the inlet is (are) of longitudinal dimension equal to $\lambda$air/2, and close to the outlet, the longitudinal dimension of the passage portion(s) is equal to $\lambda$methane/2. Between the inlet and the outlet, the longitudinal dimension of the passage portions increases but it is possible for a plurality of consecutive passage portions to have the same longitudinal dimension.

It should be observed that it is also possible to design the passage in such a manner that the longitudinal dimension of the passage portions decreases from the inlet of the passage to the outlet thereof.

It should be observed that when attenuation means are designed that can adapt to several types of gas, the attenuation effect obtained is not as good as that which is obtained by attenuation means that are particularly adapted to one type of gas. For example, when the attenuation means are particularly adapted to one type of gas they may provide 40 dB of attenuation, while a design of the kind shown in FIG. 5 may provide 25 dB of attenuation.

Although the grooves and the projections are disposed perpendicularly to the main propagation direction of the parasitic ultrasound waves in the examples described, that condition is not essential. Nevertheless, the grooves and the projections must have a disposition that is not parallel to the main propagation direction of the parasitic waves for them to be affected by a reduction in transverse propagation section over each projection.

Figure 6:
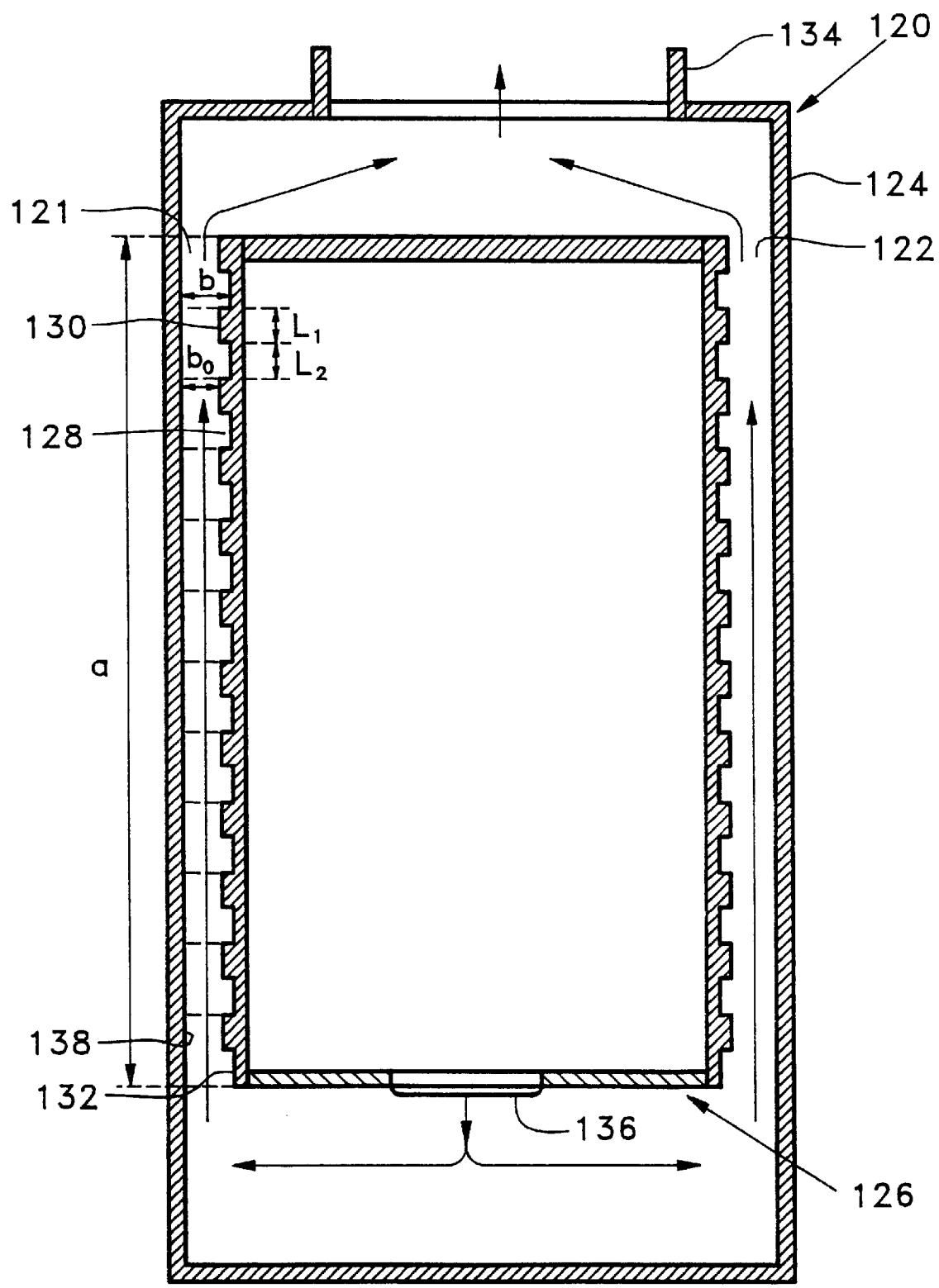
FIG. 6 is a view analogous to FIG. 3 but in which the fluid flows in the opposite direction.

FIG. 6 is a diagram of another configuration of a meter 120 in which passages 121, 122 serve as means for attenuating parasitic ultrasound waves possessing the same characteristics as the passages 36, 38, and 40 described with reference to FIGS. 1, 3, 4a to 4d, and 5 are formed between the enclosure 124 of the fluid meter and the measurement block 126. Grooves 128 and projections 130 are formed in alternation on the surface 132 of the measurement block. In this configuration, the source of noise external to the meter is placed downstream from the meter, so the passages 121, 122 are disposed between the outlet opening 136 of the measurement block 126 and the exit orifice 134. In this case also, the inside surface 138 of the enclosure 120 facing the surface 132 of the measurement block could include alternating projections and grooves to increase the effectiveness of the attenuation.

A second embodiment of the invention is described below.

Figure 7:
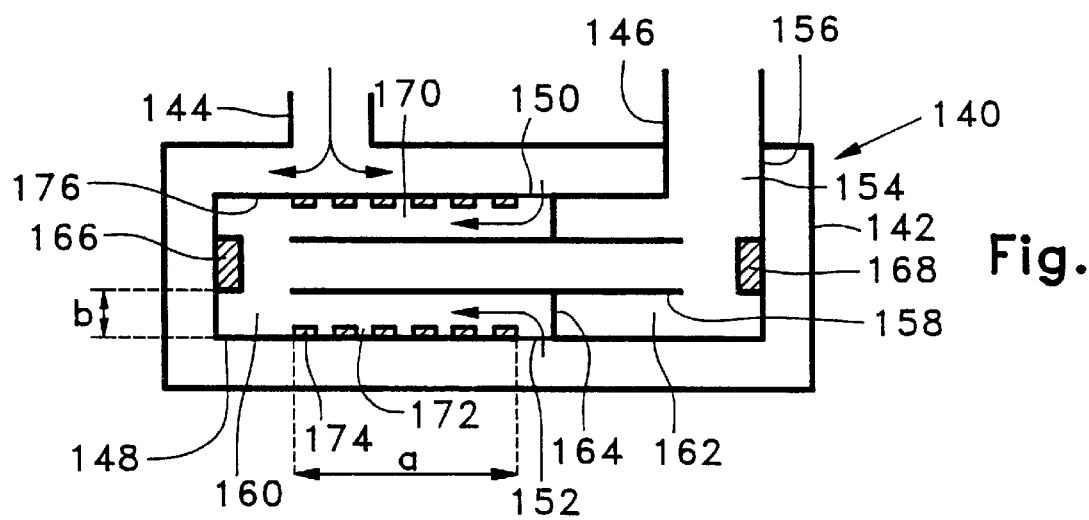
FIG. 7 is a view of a fluid meter constituting a second embodiment of the invention.

As shown in FIG. 7, a fluid meter 140, e.g. a gas meter, comprises an enclosure 142 provided with two orifices 144, 146 respectively acting as a gas inlet and as a gas outlet.

A measurement block 148 is disposed inside the enclosure and is provided with a plurality of openings 150, 152 to allow gas to penetrate into said block, and with an opening 154 extended by a coupling 156 in the form of a chimney for gas to leave said block. The coupling 156 is fixed to the outlet orifice 146.

Within the measurement block, the ultrasound measurement path is implemented in the form of a measurement duct, e.g. a tube 158.

Nevertheless, the measurement duct could, for example, be elliptical in shape as described in document EP 0 538 930 or it could have a rectangular transverse propagation section, as described in document EP 0 580 099.

The measurement block has two housings 160, 162 that are separated by a wall 164 through which the tube 158 passes.

Two ultrasound transducers 166, 168 are located in the chambers 160, 162 respectively, facing opposite ends of the tube 158.

Figure 8:
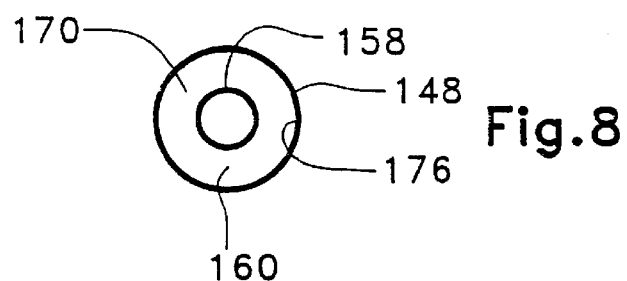
FIG. 8 is a cross-section view of the measurement block shown in FIG. 7.

As shown in FIGS. 7 and 8, the measurement block is substantially cylindrical in outside shape and the cylindrical wall of the chamber 160 co-operates with the outside wall of the tube 158 to form an annular passage 170 around said tube.

The gas which enters the enclosure 142 via the orifice 144 spreads around the measurement block 148 and penetrates into it through the openings 150, 152, after which it flows along the annular passage 170 prior to reaching the measurement path between the two transducers.

Consequently, in the annular passage 170 between the openings 150, 152 and the measurement path, a plurality of grooves 172 alternate with projections 174 on the cylindrical surface 176 of the wall of the chamber 160. These grooves and projections are circular and they extend transversely relative to the direction in which the gas propagates along the annular passage 170, preferably being perpendicular to said propagation direction.

In a manner analogous to that described with reference to FIGS. 1 to 5, this set of projections and grooves serves to attenuate parasitic ultrasound waves conveyed by the gas before the waves penetrate into the measurement tube 158.

For the attenuation to be effective, it is necessary for the transverse dimension b of the passage to be much less than the wavelength $\lambda$ of the parasitic waves, and for the longitudinal dimension of each passage portion formed by a groove/projection pair to be of the order of $\lambda/2$. Also for reasons of effectiveness, the longitudinal dimension of the annular passage 170 must not be too short.

The other characteristics and advantages described with reference to FIGS. 1 to 5 remain valid.

It should be observed that it is advantageous to dispose the passage in which the parasitic waves are attenuated along at least a portion of the length of the measurement duct in order to have a measurement block of reduced bulk.

However, when the bulk of the measurement block is not a constraint, it is naturally possible to locate the passage perpendicularly or at an angle inclined relative to the longitudinal direction of the measurement duct.

Figure 9:
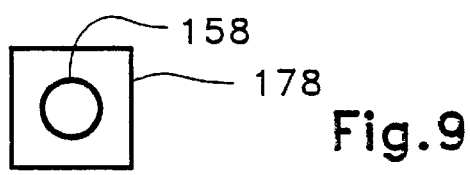
FIG. 9 is a view of a first variant embodiment of the measurement block of FIGS. 7 and 8.

It is also possible for the measurement block 148 to have a cross-section that is square or rectangular (FIG. 9) with its inside surface being provided with grooves and projections.

Figure 10:
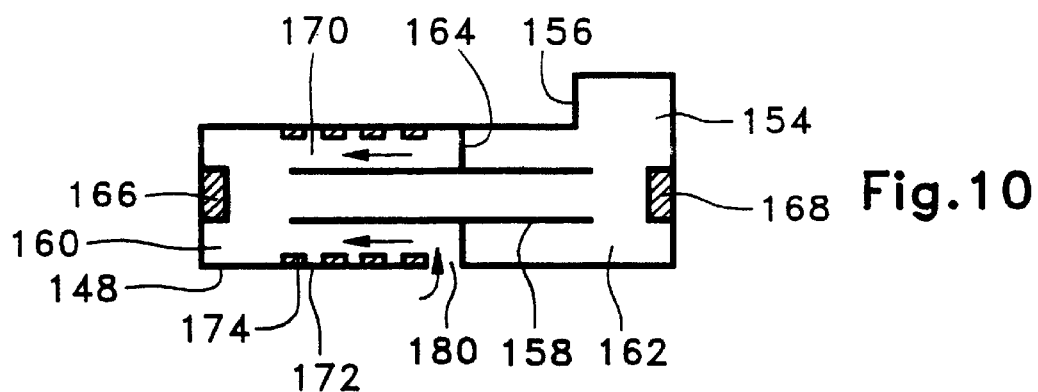
FIG. 10 is a view of a second variant embodiment of the measurement block shown in FIGS. 7 and 8.

FIG. 10 shows a second variant of the FIG. 7 configuration, but shows only the measurement block thereof. Elements already described with reference to FIG. 7 are not described again and the same references are used.

In this figure, the openings 150, 152 of FIG. 7 are replaced by a single opening 180 situated beneath the measurement block, however this opening could also be situated on top of the measurement block in the context of another variant.

The flow of gas penetrates into the chamber 160 through this opening and spreads around the measurement duct.

Figure 11:
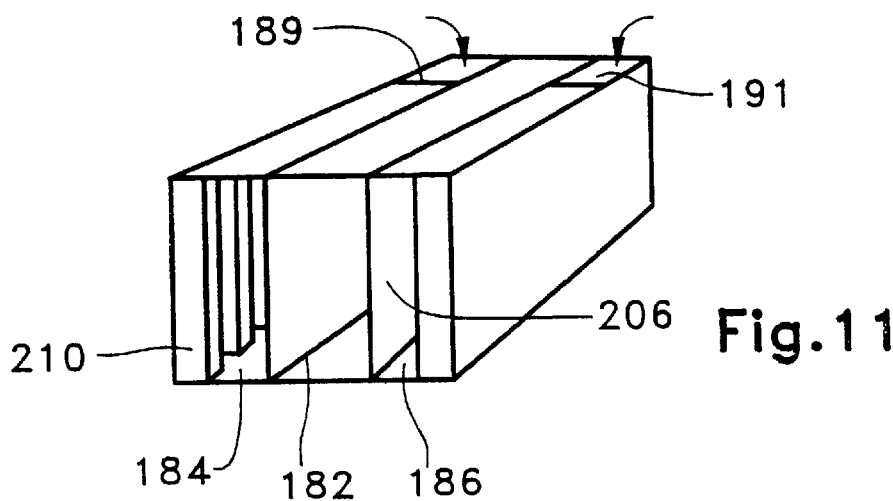
FIG. 11 is a fragmentary perspective view of a measurement block constituting a third variant embodiment.
Figure 12:
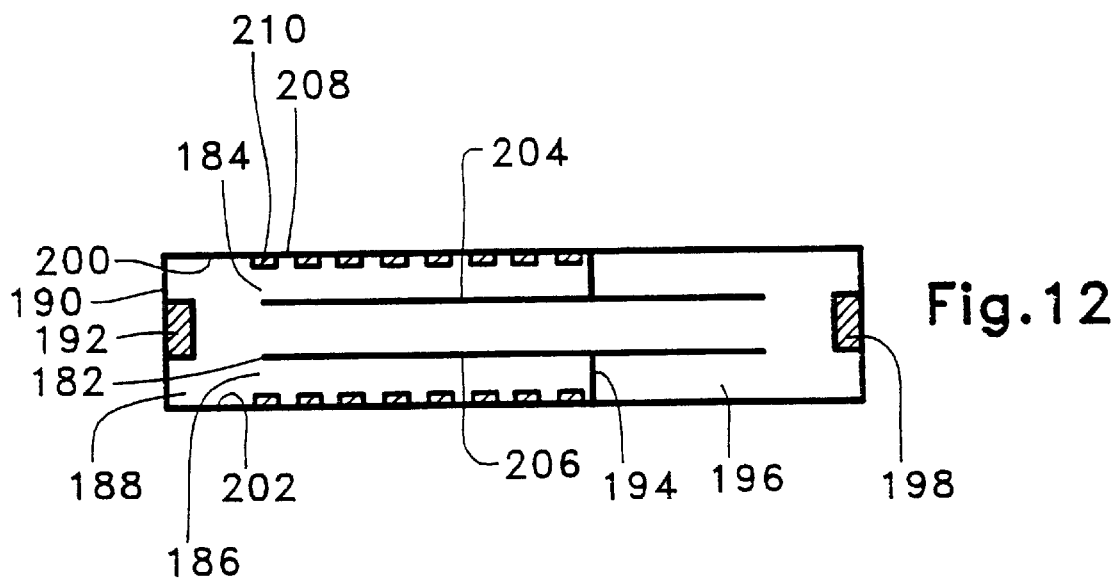
FIG. 12 is a longitudinal section view of the FIG. 11 measurement block.

FIGS. 11 and 12 show a third variant of the measurement block in which the measurement duct 182 has a cross-section that is rectangular in shape and in which two passages 184, 186 are provided over at least a portion of the longitudinal dimension of the measurement duct on either side thereof within the measurement block 190. In FIG. 11, the portion of the housing containing the ultrasound transducer is not shown. The flow penetrates into these passages via two top openings 189, 191 as shown by the arrows (FIG. 11). A transducer 192 is placed facing one end of the measurement duct 182 in the measurement block 190. The measurement duct passes through a partition 194 which subdivides the measurement block into two portions. A second ultrasound transducer 198 is placed facing the opposite end of the measurement duct.

The respective surfaces 200, 202 of the side passages 184, 186 which face the surfaces 204, 206 of the side walls of the measurement duct 182 are provided with alternating grooves 208 and projections 210 having the same characteristics as those described with reference to FIGS. 1 to 10, with the exception of their shape which depends of the shape of the side passages.

The grooves and projections are preferably disposed perpendicularly relative to the longitudinal direction of the flow in the passages.

Figure 13:
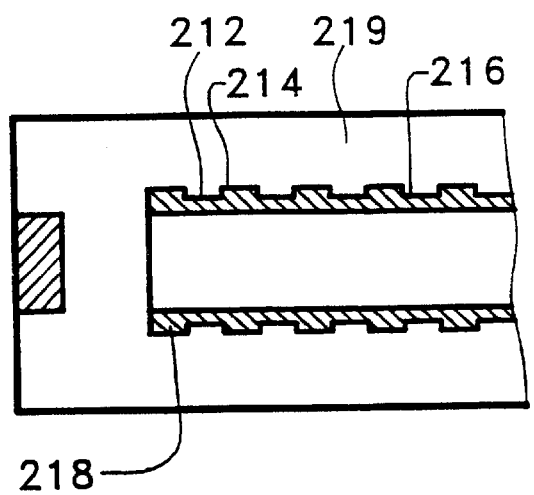
FIG. 13 is a fragmentary longitudinal section of a measurement block constituting a fourth variant embodiment.

FIG. 13 shows a fourth variant in which the grooves 212 and the projections 214 are formed on the surface(s) 216 of the measurement duct 218 whether only one passage 219 is provided around the duct in a manner analogous to FIGS. 7 to 10, or whether two or more passages are provided on either side of the duct (FIGS. 11 and 12). This variant is advantageous insofar as it is easier to make the projections and grooves directly on the measurement duct which is manufactured separately from the remainder of the measurement block and which is subsequently inserted into the measurement block, then it is to make them on the walls of the chamber in which part of the duct is located.

Figure 14:
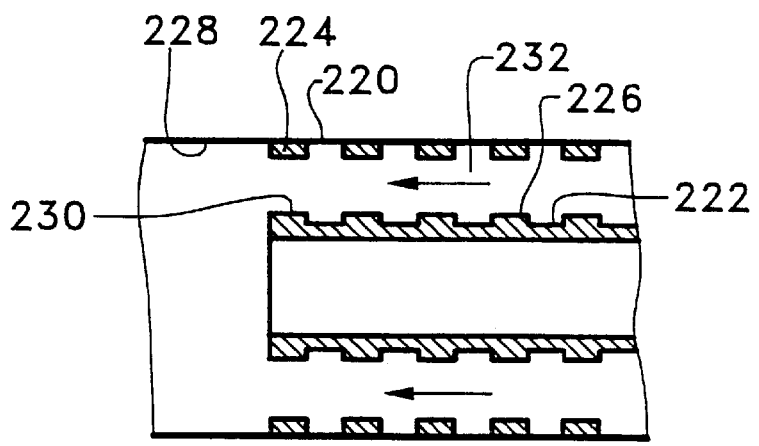
FIG. 14 is a fragmentary longitudinal section view of a measurement block constituting a fifth variant embodiment.

FIG. 14 shows a fifth variant in which the grooves 220, 222 and the projections 224, 226 are formed simultaneously on both facing surfaces 228, 230 of the passage(s) 232. This variant can be applied to any of the configurations shown in FIGS. 7 to 13.

Figure 15:
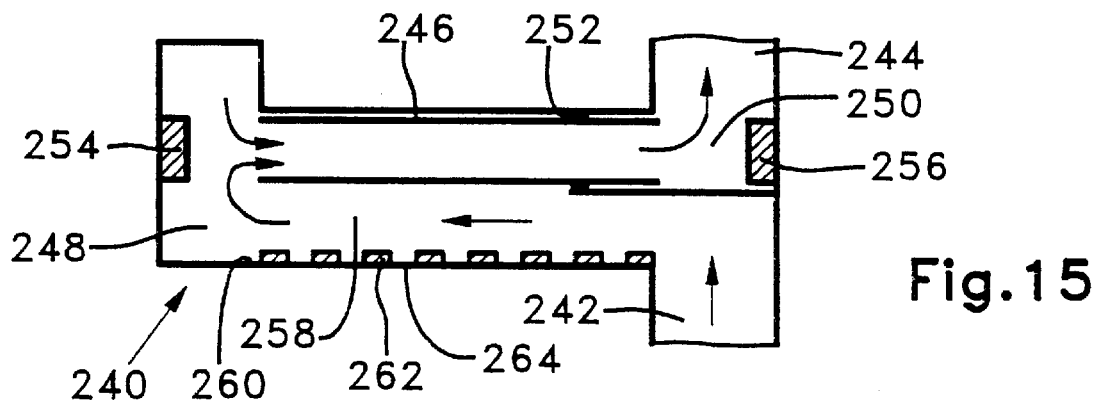
FIG. 15 is a longitudinal section view of a measurement block constituting a sixth variant embodiment.

The measurement block 240 shown in FIG. 15 shows another variant in which two openings 242, 244 respectively for fluid inlet and fluid outlet relative to said measurement block are substantially in alignment with each other.

These openings may be connected respectively to mutually aligned fluid inlet and outlet orifices, or, as shown in FIG. 15, the measurement block can be integrated in an enclosure of the type shown in FIG. 7. The measurement block 240 has a measurement duct 246 and two housings 248, 250 separated by a partition 252 through which said duct passes.

Two ultrasound transducers 254, 256 are placed in the housings 248, 250 respectively facing the two opposite ends of the measurement duct 246.

A passage 258 is provided along one side only of the measurement duct, firstly to convey the fluid from the opening 242 to the end of the duct situated facing the transducer 254, and secondly to attenuate the parasitic ultrasound waves propagating in the fluid. To this end, the passage 258 has projections 262 alternating with grooves 264 on one of its faces 260 which faces the outside surface of the measurement duct 246, and their characteristics are the same as those described with reference to the preceding figures.

Figure 16B:
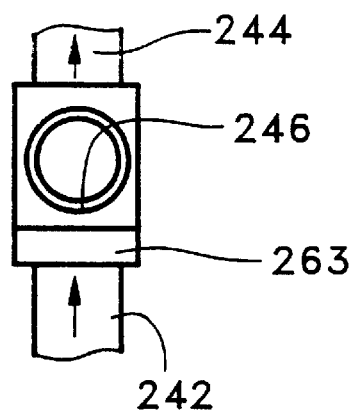
Figure 16A:
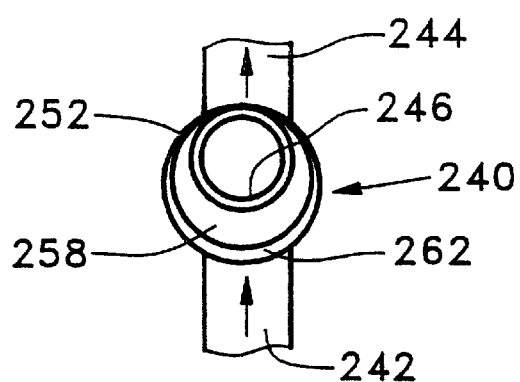
FIG. 16a is a cross-section of the measurement block shown in FIG. 15.

If the portion of the housing 248 situated along the measurement duct is of circular cross-section, then the grooves and projections 263 may be semicircular in shape (FIG. 16a).

Otherwise, if the portion of the housing situated along the measurement duct has a cross-section that is square or rectangular in shape, then the grooves and projections may be rectilinear in shape (FIG. 16b).

Compared with the configurations shown in FIGS. 7 to 13, the configuration shown in FIGS. 15, 16a, and 16b gives the advantage of providing the fluid with a greater length over which it is in contact with the grooves and projections, thereby increasing the effectiveness of parasitic ultrasound wave attenuation.

To further increase this effectiveness, it is also possible to provide grooves and projections on the surface of the measurement duct 246 facing the surface 260.

In yet another variant as shown in FIGS. 17 and 18, the measurement block 270 still has two housings 272, 274 in which two ultrasound transducers 276, 278 are placed respectively facing the opposite ends of a measurement duct 280 that passes through a partition 282 separating said housings. A fluid inlet opening 284 and a fluid outlet opening 286 are substantially in alignment with each other.

The measurement block 270 also carries a separator wall 288 disposed along the measurement duct 280 and which co-operates with another wall 290 situated facing it to form the passage 292 taken by the fluid to reach the measurement duct.

In this passage, at least one 294 of the surfaces of the two facing walls 288, 290 is provided with alternating projections 296 and grooves 298 which can be disposed along the full length of the wall.

To further increase effectiveness, the surface 300 of the wall 288 may also be provided with alternating projections 302 and grooves 304 shown in dashed lines in FIG. 17.

FIG. 18 is an enlarged cross-section view (along B—B) of the measurement block shown in FIG. 17, in which the thickness of the walls can be seen.

Thus, the general shape of the measurement block and its wall 303 is circular in cross-section.

The measurement block is closed at both longitudinal ends by two respective end walls 305 and 306 (FIG. 17). At the passage 292, the wall 303 is also the separator wall 288.

Two parallel longitudinal side walls 307, 308 are tangential to the outside surface of the wall 303 and extend downwards towards the wall 290 so as to form the sides of the passage 292. Advantageously, the wall 290 is a separate part fitted to the measurement block 270 and forming a cap thereon.

This makes it possible for the grooves and the projections to be formed easily by molding one and/or the other of the two walls 288, 290 before the wall 290 is fixed on the measurement block.

This also presents another advantage: when the measurement block must be adaptable to different ranges of fluid flow rates, it suffices to change the wall 290 and replace it with another wall having the same longitudinal dimension but having transverse dimensions that are modified so as to change the transverse flow section offered to the fluid, while serving conditions relating to the transverse dimensions of the propagation section relative to the wavelength $\lambda$.

FIG. 18 shows the shape of the projections 296 which is adapted to the shape of the passage and of the separator wall 288. In this figure, the projections 302 are not shown for reasons of clarity.

When flowing over the projections, the fluid has a flow section that is M-shaped.

This configuration makes it possible to have a flow section that does not give rise to excessive headloss while still effectively attenuating parasitic ultrasound waves.

To enlarge the flow rates of a meter whose measurement block has such a configuration, it suffices to change the wall 290 forming the cover and to replace it with a wall such that the branches of the M-shape in contact with the side walls 307, 308 are taller than those shown in FIG. 18, thereby increasing the flow section offered to the fluid.

FIG. 19 shows a portion of a variant in which the means 310, 312 for attenuating parasitic ultrasound waves are analogous to those described with reference to the preceding figures and are disposed between the outlet opening 314 of the measurement block 316 and the measurement duct 318 for the purpose of preventing parasitic waves propagating into the ultrasonic measurement path from downstream of the fluid meter.

In certain fluid meter configurations, the measurement duct 320 does not constitute the full ultrasonic measurement path but only a portion thereof. For example, the cross-section of the measurement duct may be circular or rectangular in shape, as described in document WO 91/09280.

There are at least two ultrasound transducers 322, 324 which are mounted on the same side of the measurement duct 320, as shown in FIG. 20. They could also be mounted on diametrically opposite sides and the ultrasonic measurement path can thus have various different shapes (V, W, . . . ). The transducers 324 is shown placed in various locations (in dashed lines) to indicate the possible appearance of the measurement paths. With configurations of this type, it is possible to provide alternating projections 326 and grooves 328 inside the duct upstream and/or downstream of the measurement part depending on the location of the noise source in order to attenuate parasitic ultrasound waves coming from the outside.

In order to be able to form the projections and the grooves in the duct, the duct may be made in two parts, for example.

If there is not enough room available in the measurement duct, then it is preferable to place the projections and grooves outside it, e.g. using one of the configurations shown in FIGS. 7 to 19.

When it is necessary for the external acoustic noise conveyed by the fluid to be attenuated to a very great extent, it can be advantageous to combine the characteristics shown in FIGS. 1 to 6 where the passage(s) is(are) formed between the enclosure of the meter and the measurement block, with the characteristics show in FIGS. 7 to 20 where the passage (s) is (are) formed in the measurement block itself.

At lower noise levels, the configurations shown in FIGS. 1 to 6 or the configurations shown in FIGS. 7 to 20 can suffice on their own.

Providing the means for attenuating parasitic ultrasound waves in the measurement block instead of between the measurement block and the enclosure in which it is placed has advantages.

The dimensions of the enclosure containing the measurement block and the locations of the fluid inlet and outlet orifices vary, depending on national requirements. Consequently this makes it necessary to modify the size of the projections and grooves so as to retain the same effectiveness in attenuation if they are located between the measurement block and the enclosure, however such modifications are not necessary when the projections and the grooves are disposed in one or more passages formed within the measurement block.

A particularly advantageous aspect of the invention is shown and described with reference to FIGS. 21a and 21b.

In an ultrasonic measurement block, shown in part, two ultrasound transducers are disposed at opposite ends of a measurement duct 478 which constitutes the ultrasonic measurement path.

The fluid which penetrates into the measurement block flows into the measurement duct 478 via the end 478a thereof, flows along the duct, leaves it via its end 478b, and escapes from the measurement block.

Normally, when the ultrasound transducers are in operation, ultrasound waves are emitted at a frequency which is determined by one of the transducers, propagate inside the measurement duct 478, and reach the other transducer, e.g. 476, and the propagation time of these waves is used for determining the flow rate of the fluid.

Nevertheless, under certain circumstances, acoustic coupling can exist between two propagation media disposed in contact, in particular between the fluid medium situated inside the measurement duct 478 and the medium constituting the wall of the measurement duct 478.

This happens, for example, when the fluid medium is water and the measurement duct is made of metal, e.g. steel. The same thing can also happen when the fluid medium is a gas and the measurement duct is made of plastic.

Under such circumstances, the parasitic ultrasound waves propagating inside the measurement duct 478 from the ultrasound transducer 474 penetrate in part into the wall of the measurement duct 478, propagate along said wall parallel to the ultrasonic measurement path inside the duct, and reach the opposite ultrasound transducer 476, before or at the same time as the ultrasound waves propagating inside said measurement duct. The transducer 476 then sees superposed ultrasound waves, making any accurate measurement of the flow rate of the fluid inside the measurement duct quite impractical.

In this example, the measurement duct is a circular-section tube, but it could equally well be a measurement duct having a cross-section that is rectangular in shape, e.g. as described in European patent application No. 0 580 099.

Figure 21A:
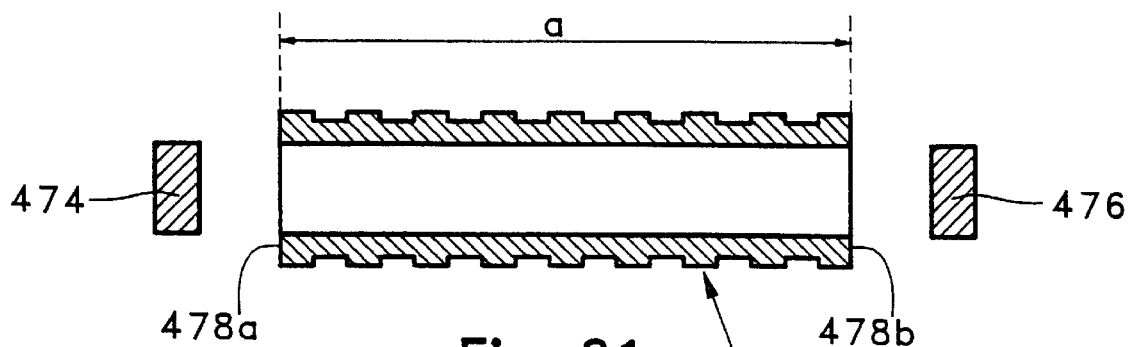
FIG. 21a shows a measurement block for a fluid meter constituting another embodiment of the invention.
Figure 21B:
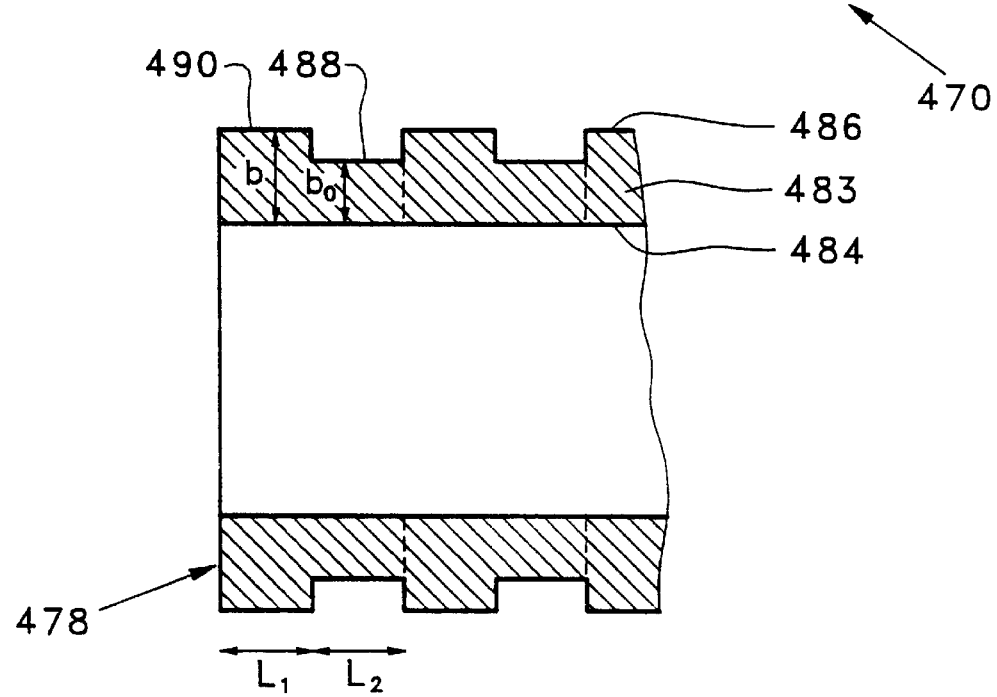

The measurement duct 478 shown in FIGS. 21a and 21b has a peripheral wall 483 of longitudinal dimension a and forms a passage in which parasitic ultrasound waves propagate in a main direction that coincides with the longitudinal direction of the tube. The transverse dimension b of the passage perpendicular to its longitudinal dimension a and which is much smaller than the wavelength $\lambda$ of parasitic waves in the medium under consideration, namely steel. For example a=100 mm, bo=2 mm, b=3 mm, and $\lambda$=6 mm. The passage is defined by two facing concentric longitudinal surfaces 484 and 486, the outside surface of the measurement duct being the surface 486. Mutually parallel grooves 488 are machined in the outside surface 486 of the measurement duct, thereby forming projections 490 between consecutive pairs of grooves.

Each couple formed by a groove 488 and a consecutive projection 490 defines, in the wall thickness 483, a passage portion in which the parasitic ultrasound waves are subjected to a reduction of propagation section at said groove which projects into said wall.

These grooves and projections are organized over the entire longitudinal dimension a of the measurement duct and each has a longitudinal dimension L1 for the projection 490 and L2 for the groove 488. The longitudinal dimension of each passage portion, L1+L2, is substantially equal to $\lambda/2$. For example, L1=1.5 mm, and L2=1.5 mm.

The conditions specified above concerning the attenuation means shown in FIGS. 1 and 3 remain valid in this configuration. It should be observed that the small transverse dimension bo must not be less than b/2 in order to conserve the stiffness of the tube. In this configuration, the grooves are annular in shape, as are the projections.

Figure 21C:
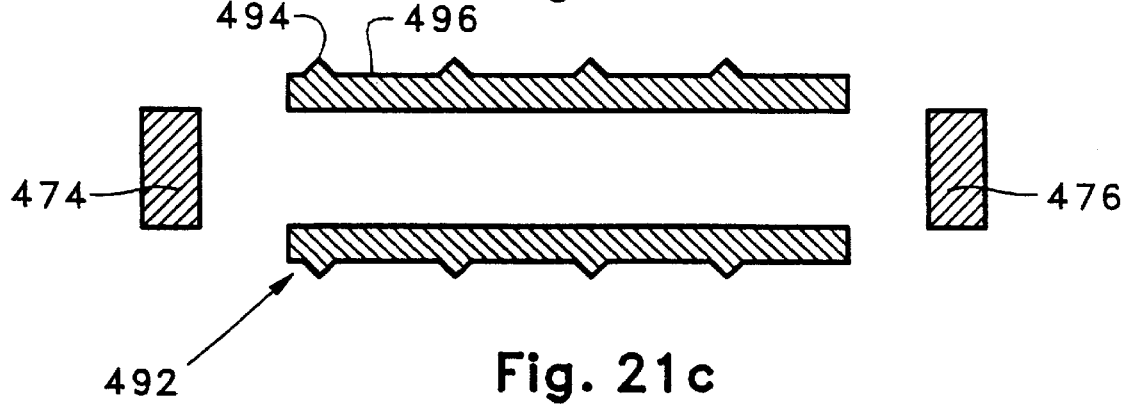

In FIGS. 21c, only the ultrasound transducers 474, 476 and the measurement duct 492 are shown.

In the variant shown in FIG. 21c, the grooves 496 have a longitudinal dimension that is much larger than the projections 494 which form ribs. Each groove is trapezium-shaped, with a shorter parallel side situated on the outside surface of the tube 492.

It should be observed that the shapes shown in FIGS. 4b and 4c could equally well be used on the outside surface of the measurement duct 492.

A measurement duct configured in this way attenuates parasitic ultrasound waves very effectively.

Figure 22B:
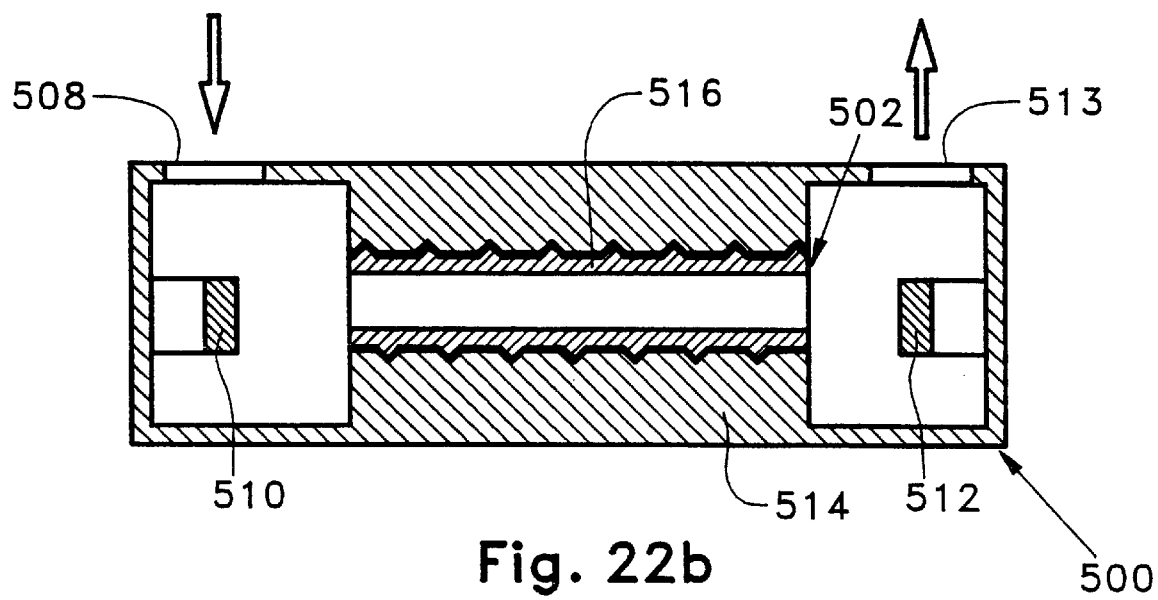
FIG. 22b is a view showing the measurement duct of FIG. 22a integrated in a measurement block of a fluid meter of the invention.
Figure 22A:
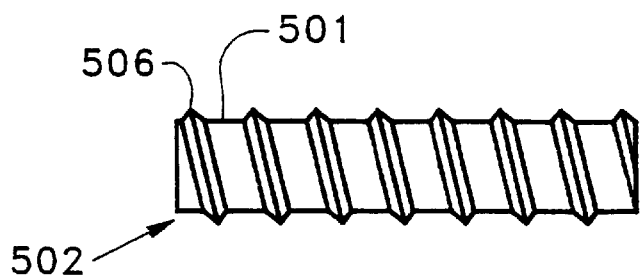

FIGS. 22a and 22b show another variant of the attenuation means of the invention.

In FIG. 22a, a circularly-shaped measurement duct (tube) 502 is machined so as to form a helically-shaped groove 504 and thread 506 on its outside surface. This tube can be placed inside a measurement block of the kind shown in FIG. 21a, or of the kind shown in FIG. 22b.

In FIG. 22b, the measurement block 500 has an opening 508 through which the fluid enters into a first chamber having an ultrasound transducer 510 therein facing one end of the measurement duct 502, and the other end of the measurement duct 502 has a transducer 512 facing it situated inside a second chamber which is in communication with an outlet 513 through which the fluid leaves. In this figure, the measurement block 500 has a thick-walled central portion 514 in which a cylindrical housing 516 is formed. Advantageously, the cylindrical measurement duct shown in FIG. 22a is inserted inside the housing 516 by screw-engagement using its threaded outside surface.

In addition to this advantageous characteristic, the measurement duct 502 configured in this way possesses the properties described above relative to the other figures for effectively filtering parasitic ultrasound waves propagating in the wall of said duct 502.

What is claimed is:

1. An ultrasonic fluid meter comprising ultrasound transducers placed in contact with the fluid defining between them an ultrasonic measurement path and emitting and receiving ultrasound waves into the fluid along said measurement path at at least one ultrasound frequency, and means for attenuating "parasitic" ultrasound waves of wavelength λ which disturb reception by one of the transducers of ultrasound waves emitted by the other transducer, wherein the attenuation means are constituted by at least one passage in which said parasitic waves propagate in a main direction corresponding to a "longitudinal" dimension a of said passage, said passage having a transverse direction b perpendicular to the dimension a and much smaller than the wavelength λ of the parasitic waves in the propagation medium, said passage comprising a plurality of consecutive passage portions each having a part that presents a reduction in transverse propagation section along the dimension b of the passage, with the longitudinal dimension of each passage portion being substantially equal to λ/2.

2. A fluid meter according to claim 1, in which the passage is defined by at least two longitudinal surfaces facing each other and spaced apart along the dimension b, and on which at least one of them has a plurality of mutually parallel consecutive grooves formed in alternation with projections, each passage portion having a pair constituted by a groove and a projection.

3. A fluid meter according to claim 2, in which each groove has a V-shaped profile.

4. A fluid meter according to claim 2, in which each groove has a U-shaped profile thereby causing said surface to be crenellated.

5. A fluid meter according to claim 1, in which the parasitic waves are of wavelength that varies within a determined range, and the longitudinal dimension of the passage portions varies in increasing or decreasing manner to cover the determined range of wavelengths.

6. A fluid meter according to claim 1, comprising an enclosure provided with a fluid inlet orifice and a fluid outlet orifice and a fluid outlet orifice, a measurement block fitted with ultrasound transducers and provided with at least two openings respectively enabling the fluid to reach the ultrasonic measurement path and to leave it, the passage(s) in which the parasitic ultrasound waves propagate being formed between the measurement path and at least one of the fluid inlet and outlet orifices.

7. A fluid meter according to claim 6, in which said measurement block is disposed inside said enclosure in such a manner as to form between them the passage(s) in which the parasitic waves propagate, and along which the fluid flows prior to entering the measurement block or after leaving it.

8. A fluid meter according to claim 2, in which the surface on which the grooves are formed is the surface of the measurement block.

9. A fluid meter according to claim 6, in which the measurement block includes the passage(s) enabling the parasitic ultrasound waves to be attenuated and formed between at least one of said openings and said measurement path, said passage(s) also serving to convey the fluid.

10. A fluid meter according to claim 6, in which the measurement path is formed within a measurement duct.

11. A fluid meter according to claim 10, in which the measurement duct is at least partially disposed in a housing of the measurement block.

12. A fluid meter according to claim 10, in which the passage(s) is (are) formed between the walls of the housing and the measurement duct.

13. A fluid meter according to claim 10, in which the passage(s) is (are) formed around the measurement duct.

14. A fluid meter according to claim 10, in which the passage(s) is (are) formed on one side only of the measurement duct.

15. A fluid meter according to claim 10, in which the passages are formed on either side of the measurement duct.

16. A fluid meter according to claim 9, in which the passage(s) is (are) formed along at least a portion of the measurement path.

17. A fluid meter according to claim 2, in which the groove/projection pairs are formed on the outside surface of the measurement duct.

18. A fluid meter according to claim 10, in which the passage(s) is (are) disposed inside the measurement duct.

19. A fluid meter according to claim 10, in which the measurement block includes a "separator" wall on its side where the passage(s) is (are) formed to separate the measurement duct from the passage(s).

20. A fluid meter according to claim 19, in which the measurement block includes another wall which is disposed facing the separator wall in such a manner that the facing surfaces of these two walls define the passage(s).

21. A fluid meter according to claim 20, in which the other wall is a separate part fitted to the measurement block.

22. A fluid meter according to claim 1, including a measurement duct constituting at least a portion of the ultrasound measurement path and presenting at least one peripheral wall corresponding to the passage in which the parasitic ultrasound waves propagate.

23. A fluid meter according to claim 2 and 22, in which the surface on which the grooves are formed is the outside surface of the measurement duct, the reduction of the propagation section in each passage portion being located at each groove in said wall.

24. A fluid meter according to claim 22, in which the measurement duct is a tube.

25. A fluid meter according to claim 24, in which the grooves are annular in shape and are disposed along the tube.

26. A fluid meter according to claim 24, in which a groove of helical shape is formed in the outside surface of the measurement tube.

* * * * *